(12) United States Patent
Chen

(10) Patent No.: US 10,759,490 B1
(45) Date of Patent: Sep. 1, 2020

(54) BICYCLE PEDAL WITH VARIABLE SHAFT MECHANISM

(71) Applicant: Yong-Fu Chen, Taichung (TW)

(72) Inventor: Yong-Fu Chen, Taichung (TW)

(73) Assignee: SCADA INTERNATIONAL CO., LTD., Taichung (TW)

( * ) Notice: Subject to any disclaimer, the term of this patent is extended or adjusted under 35 U.S.C. 154(b) by 0 days.

(21) Appl. No.: 16/586,864

(22) Filed: Sep. 27, 2019

(51) Int. Cl.
  *B62M 3/08*   (2006.01)
  *F16C 33/10*  (2006.01)
  *F16C 23/04*  (2006.01)

(52) U.S. Cl.
  CPC .............. *B62M 3/08* (2013.01); *F16C 23/04* (2013.01); *F16C 33/1025* (2013.01)

(58) Field of Classification Search
  CPC ................................. B62M 3/08; B62M 3/086
  USPC ........................................................ 74/594.4
  See application file for complete search history.

(56) References Cited

U.S. PATENT DOCUMENTS

| 6,085,614 A * | 7/2000 | Lin ......................... B62M 3/086 36/131 |
| 6,393,940 B1 * | 5/2002 | Ueda ....................... B62M 3/086 74/594.4 |
| 10,583,892 B1 * | 3/2020 | Winefordner .......... B62M 3/086 |
| 2010/0064846 A1 * | 3/2010 | Tsai ........................ B62M 3/08 74/594.4 |
| 2011/0088508 A1 * | 4/2011 | Chen ....................... B62M 3/086 74/594.6 |
| 2012/0090424 A1 * | 4/2012 | Curran .................... B62M 3/08 74/594.4 |
| 2017/0096188 A1 * | 4/2017 | Bigolin .................. B62M 3/086 |
| 2017/0101157 A1 * | 4/2017 | Hsieh ..................... B62M 3/086 |
| 2019/0152559 A1 * | 5/2019 | Jentzsch ............... A43B 1/0054 |
| 2019/0168842 A1 * | 6/2019 | Ball ....................... A43B 1/0054 |

* cited by examiner

*Primary Examiner* — Vinh Luong

(57) ABSTRACT

A bicycle pedal includes a pedal body, a shaft, a bearing, a sleeve, a bushing, a nut and a lid. The pedal body has a shaft hole with a first opening, a second opening and a first stopping step. The shaft in the shaft hole has a middle section, a tail section with a thread and a second stopping step therebetween. The bearing is put around the tail section and blocked by the first stopping step. The sleeve is put around the tail section and abuts against the bearing. The bushing is selectively put around a first position or a second position of the tail section. The nut is screwed on the thread of the tail section for pushing both the adjusting bushing and the bearing toward the second stopping step. The lid is fastened in the second opening for pushing both the sleeve and the bearing toward the first stopping step.

8 Claims, 6 Drawing Sheets

BICYCLE PEDAL WITH VARIABLE SHAFT MECHANISM

TECHNICAL FIELD

The invention relates to bikes, particularly to bike pedals.

RELATED ART

For cyclists, the most important point of selecting a bicycle is mechanical performance. Besides, comfort and sizes of components of a bicycle are also necessary. A fitting size may reduce sports injury to bicycle riders.

Physical strength of a bicycle rider is delivered to bicycle wheels via pedals. Pedals are a transducing interface between a rider and a bicycle. Transducing efficiency of pedals is very important. For example, racing or serious bicycle riders always use clipless or clipless pedals to increase transducing efficiency.

A pedal has a pedal shaft that can be mounted on a crank of a bicycle and a pedal body that is rotatably supported on this pedal shaft. In almost all conventional pedals, the pedal body cannot be adjustably axially slid on the shaft. In other words, a span between a pair of pedals is unchangeable after the pedals have been mounted on cranks. The span between pedals affect not only an angle between a foot plate of a rider and a pedal, but also the rider's posture and comfort.

Although a prior pedal is provided with a variable shaft mechanism for adjusting the span. Such a pedal uses a shaft having a lengthened threaded and two bushings to make a pedal body have two axial fixing points on the shaft. However, such a structure will increase manufacturing costs and difficulty.

SUMMARY OF THE INVENTION

An object of the invention is to provide a bicycle pedal with variable shaft mechanism, which makes a pedal body have two axial fixing points on a shaft without drastically increasing costs.

To accomplish the above object, the bicycle pedal with variable shaft mechanism of the invention includes a pedal body, a shaft, a bearing, a sleeve, a bushing, a nut and a lid. The pedal body has a shaft hole with a first opening, a second opening and a first stopping step therein. The shaft is received in the shaft hole and has a middle section, a tail section and a second stopping step between the middle section and the tail section. The tail section has a thread. The bearing is put around the tail section of the shaft and in the second opening. An end of the bearing is blocked by the first stopping step. The sleeve is put around the tail section of the shaft and abuts against the bearing. The adjusting bushing is selectively put around a first position or a second position of the tail section of the shaft. The adjusting bushing is between the second stopping step and the bearing when the adjusting bushing is put at the first position, and the bearing is between the second stopping step and the adjusting bushing when the adjusting bushing is put at the second position. The nut is screwed on the thread of the tail section of the shaft for pushing both the adjusting bushing and the bearing toward the second stopping step. The lid is fastened in the second opening for pushing both the sleeve and the bearing toward the first stopping step.

DETAILED DESCRIPTION OF THE INVENTION

Figure 1:
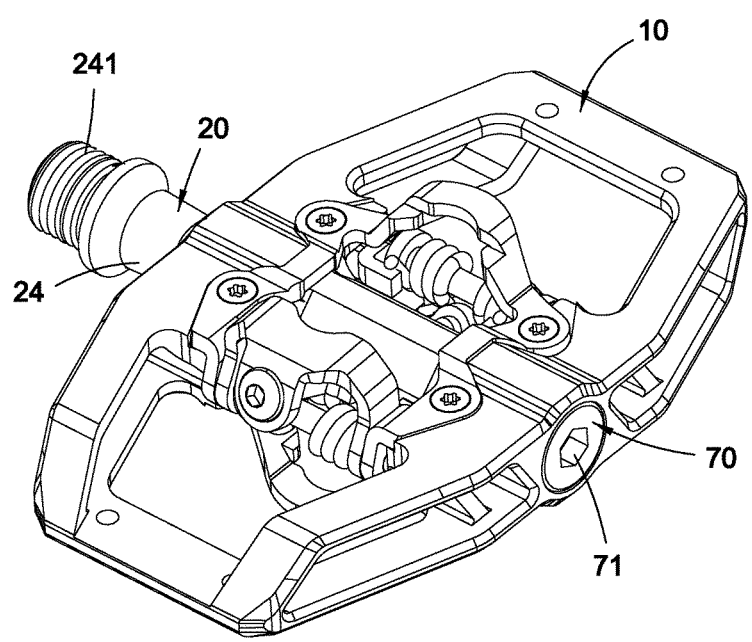
FIG. 1 is a perspective view of the invention.
Figure 2:
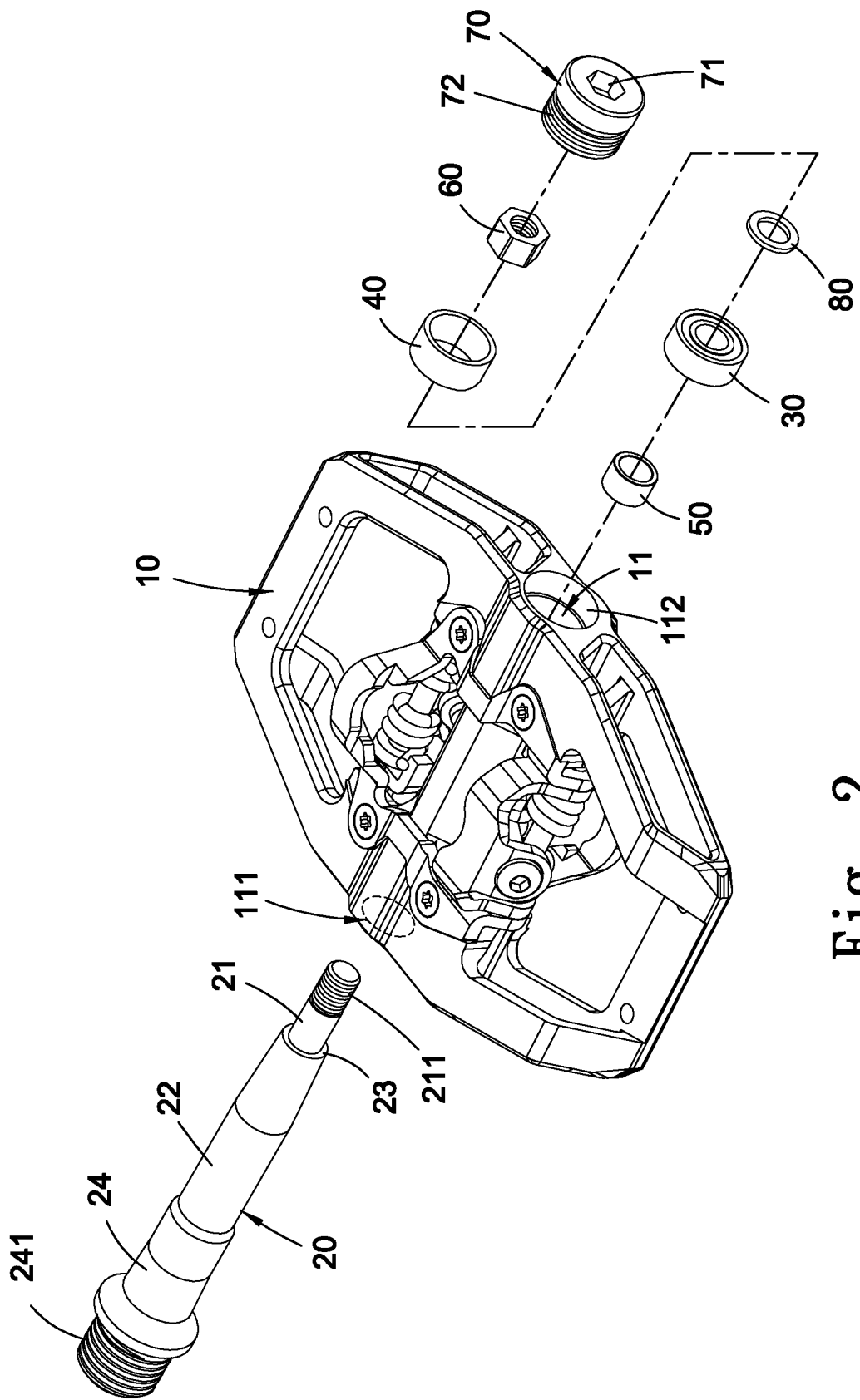
FIG. 2 is an exploded view of the invention.
Figure 3:
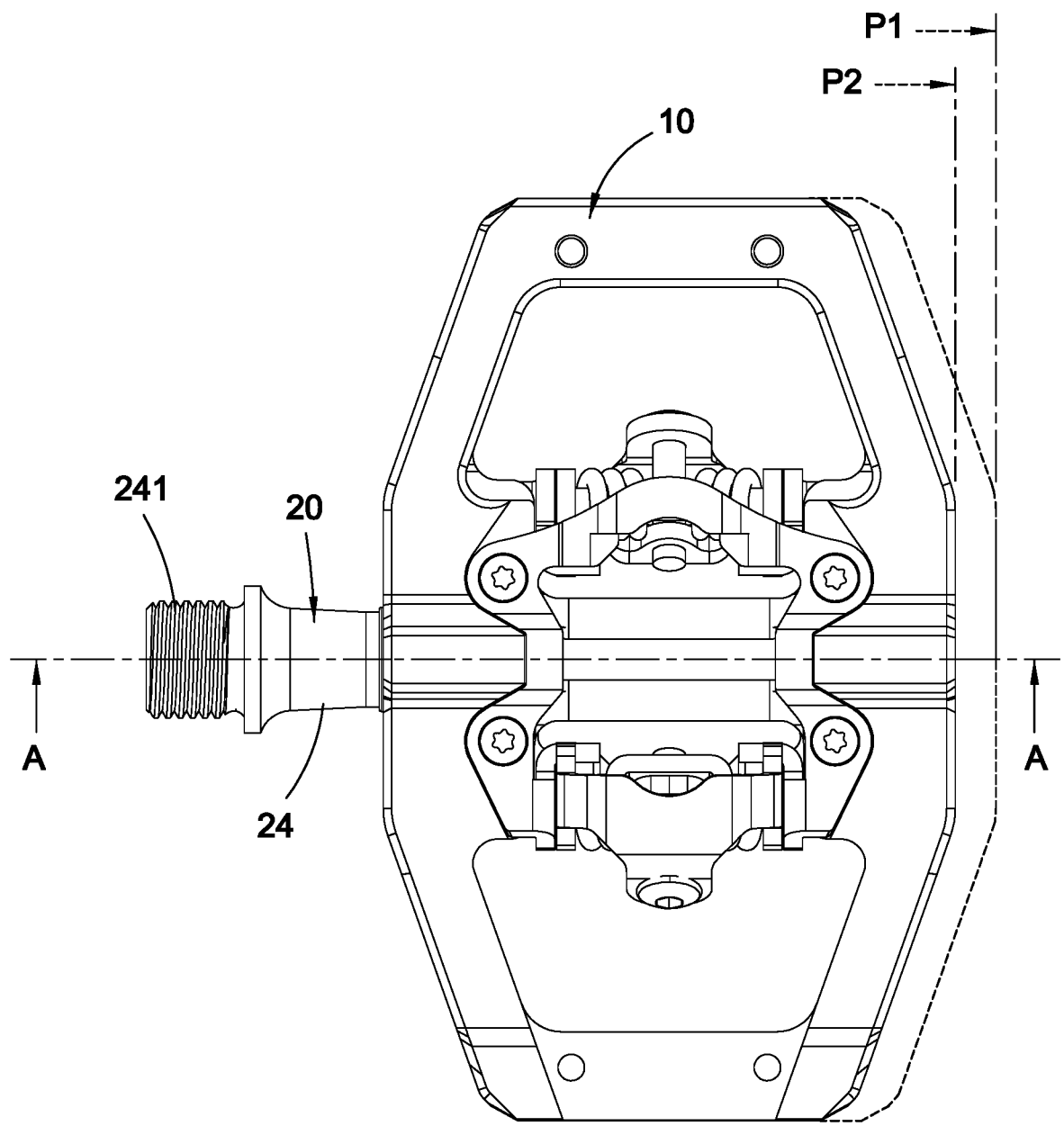
FIG. 3 is a top plan view of the invention.

Please refer to FIGS. 1-3. The bicycle pedal with variable shaft mechanism of the invention includes a pedal body 10, a shaft 20, a bearing 30, a sleeve 40, an adjusting bushing 50, a nut 60 and a lid 70.

Figure 4:
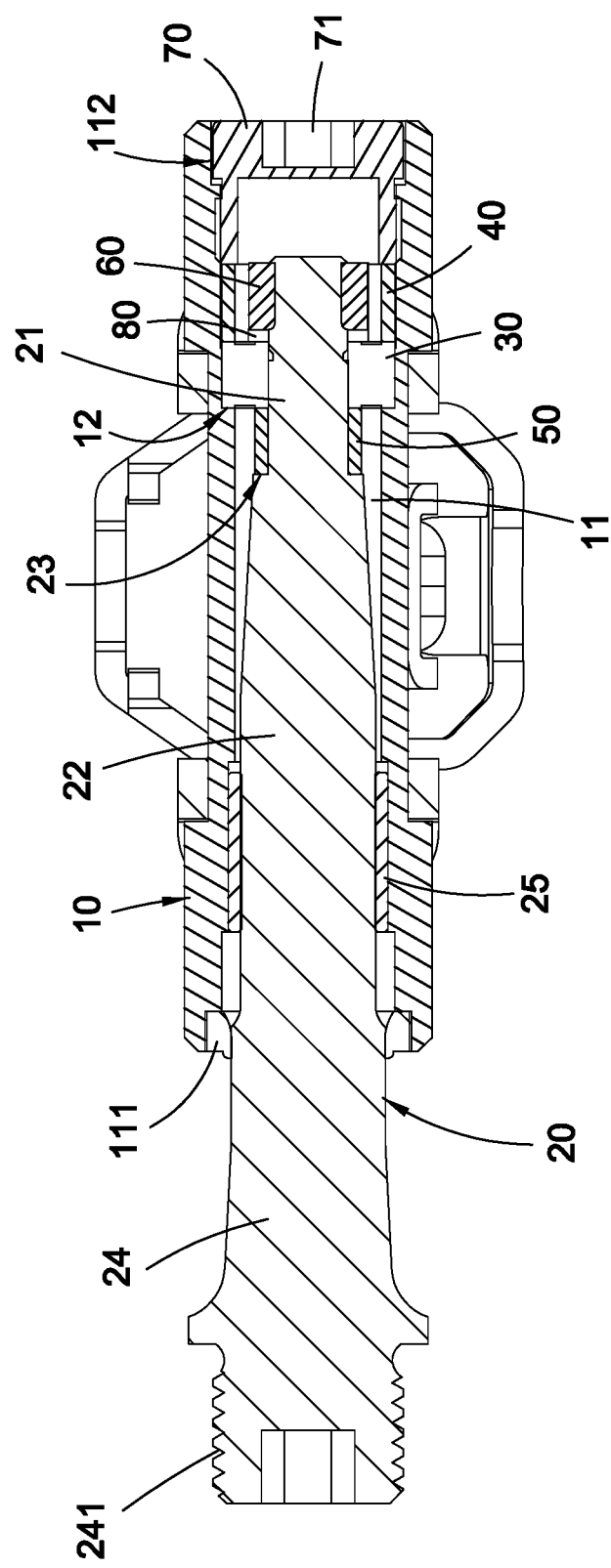
FIG. 4 is a cross-section view of the invention along line A-A in FIG. 3, which shows the adjusting bushing is located at the first position to enlarge the span.
Figure 5:
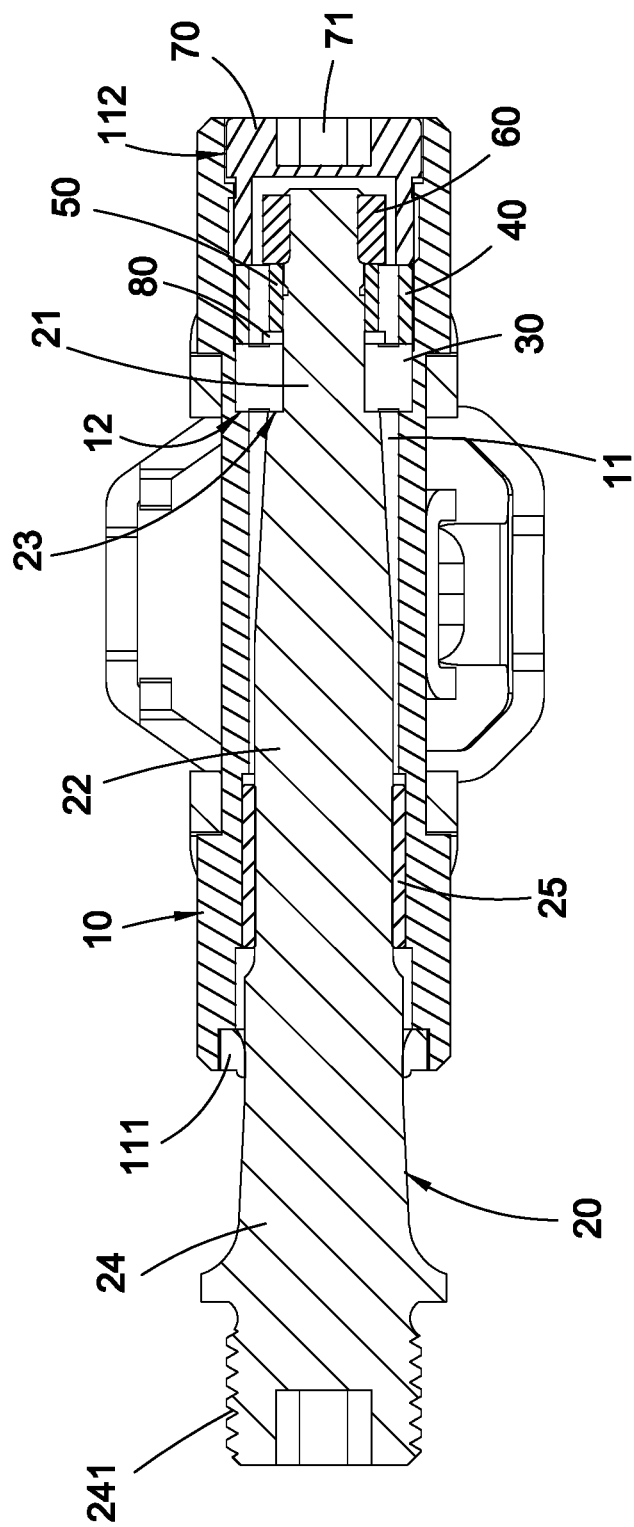
FIG. 5 is a cross-section view of the invention along line A-A in FIG. 3, which shows the adjusting bushing is located at the second position to shorten the span.

The pedal body 10 has a shaft hole 10 passing through the pedal body 10. Two ends of the shaft hole 11 are separately provided with a first opening 111 and a second opening 112. A first stopping step 12 is formed on an inner radial surface of the shaft hole 11 as shown in FIGS. 4 and 5.

The shaft 20 is inserted into the shaft hole 11 through the first opening 111. The shaft 20 has a middle section 22, a tail section 21 and a second stopping step 23 between the middle section 22 and the tail section 21. An outer end of the tail section 21 is provided with a thread 211. The middle section 22 is greater than the tail section 21 in diameter. As a result, the second stopping step 23 can be formed at the junction of the middle section 22 and the tail section 21.

The shaft 20 has a head section 24. Preferably, the middle section 22 is provided with a second bearing 25 between the shaft 20 and the shaft hole 11. The second bearing 25 may be a self-lubricating bearings, ball bearings or needle bearings. An outer end of the head section 24 is provided with a thread 241 for connecting with a crank.

The bearing 30 is put into the shaft hole 11 through the second opening 112 and around the tail section 21 of the shaft 20. The bearing 30 keeps the pedal body 10 rotatable about the shaft 20. An end of the bearing 30 is blocked by the first stopping step 12 as shown in FIGS. 4 and 5.

The sleeve 40 is inserted into the shaft hole 11 through the second opening 112 and is put around the tail section 21 of the shaft 20 and abuts against the bearing 30. The sleeve 40 pushes the bearing 30 toward the first stopping step 12.

The adjusting bushing 50 is inserted into the shaft hole 11 through the second opening 112 and is selectively put around a first position or a second position of the tail section 21 of the shaft 20. Please refer to FIG. 4. The adjusting bushing 50 is between the second stopping step 23 and the bearing 30 when the adjusting bushing 50 is put at the first position. Under this condition, the adjusting bushing 50 and the nut 60 are assembled in the order shown in FIG. 2. When the adjusting bushing 50 is at the first position, a right side (also considered as an outer side) of the pedal body 10 can reach position P1 shown in FIG. 2 to increase the distance between the pedal body 10 and a crank to which the pedal body 10 is fixed. That is, a span between a pair of pedals can be enlarged.

Figure 6:
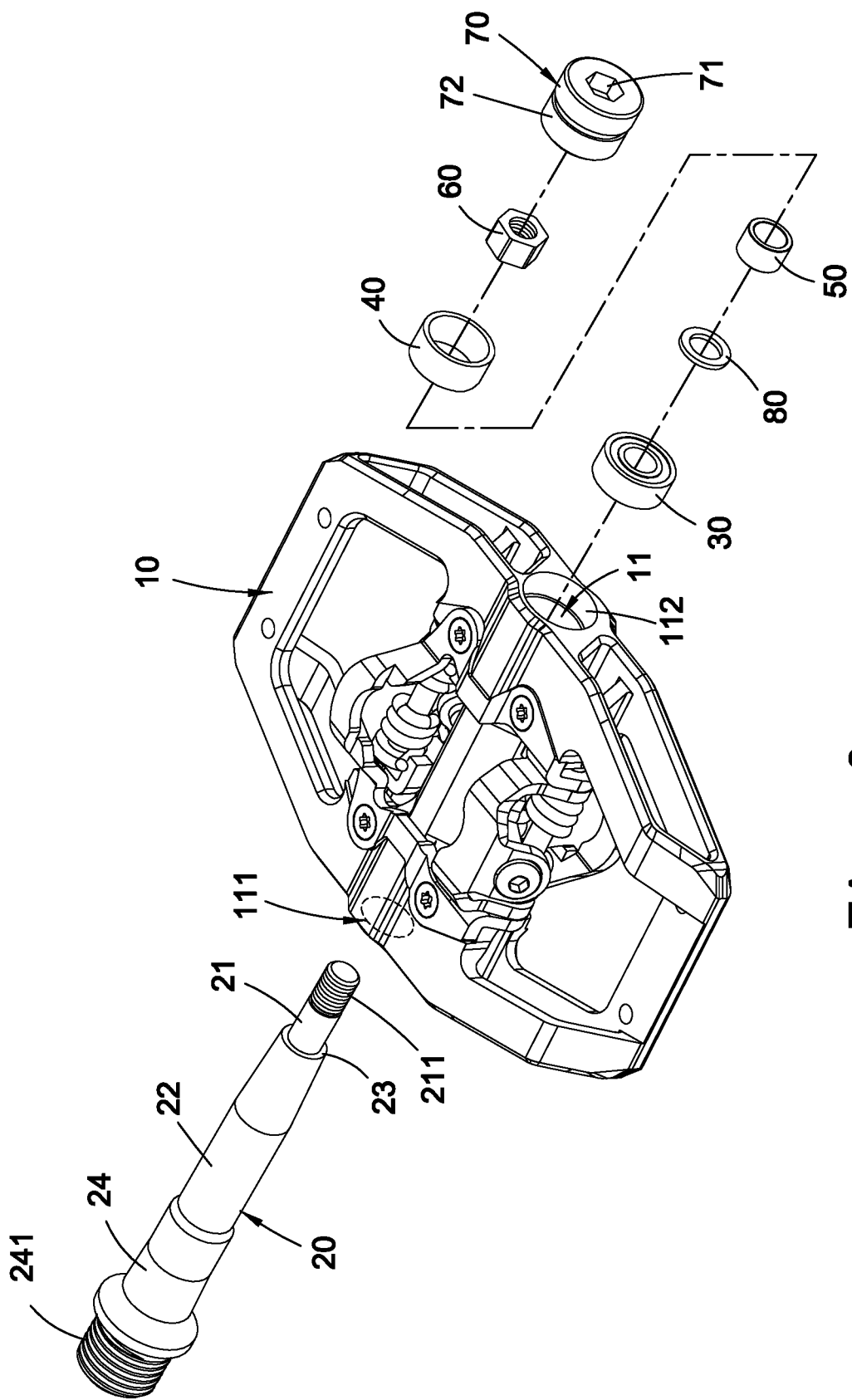
FIG. 6 is an exploded view of the invention, which shows the assembling order of the adjusting bushing and the bearing when the adjusting bushing is located at the second position.

Please refer to FIG. 5. When the adjusting bushing 50 is at the second position, the bearing 30 is between the second stopping step 23 and the adjusting bushing 50. Under this condition, the adjusting bushing 50 and the nut 60 are assembled in the order shown in FIG. 6. In comparison with the adjusting bushing at the first position, when the adjusting bushing is put at the second position, the distance between the pedal body 10 and the crank becomes shorter. The right side of the pedal body 10 can only reach position P2 shown in FIG. 2 to decrease the distance between the pedal body 10 and a crank.

The nut 60 is screwed on the thread 211 of the tail section 21 of the shaft 20 for pushing both the adjusting bushing 50 and the bearing 30 toward the second stopping step 23. The nut 60 guarantees the shaft 20 not to slide or loosen in the shaft hole 10 in the axial direction. Preferably, both the thread 211 of the tail section 21 and a thread of the nut 60 are left-hand threads.

The lid 70 is fastened in the second opening 112 of the shaft hole 11 for pushing both the sleeve 40 and the bearing 30 toward the first stopping step 12. The lid 70 fixes both the sleeve 40 and the bearing 30 in the shaft hole 11. The relative position between the bearing 30 and the pedal body 10 is fixed. This means the position of the bearing 30 on the shaft 20 determines the relative position of the pedal body 10 against the shaft 20. In other words, when the position of the bearing 30 at the shaft 20 is relatively far from the head section 24, the position of the pedal body 10 against the head section 24 will become relatively far. That is, the distance between the pedal body 10 and the crank is increased and the span between two pedals is also increased. As a result, the span between two pedals can be easily and rapidly changed by changing the order and position of the adjusting bushing 50.

Preferably, the lid 70 is of a tubular shape with a closed end. The closed end of the lid 70 is provided with a hexagonal hole 71, so that the lid 70 can be fastened into the second opening 112 by a hexagonal wrench. The lid 70 is provided with an outer thread 72 and the second opening 112 is provided with an inner thread, so that the lid 70 can be fastened into the second opening 112 by screwing the inner thread and the outer thread 72 as shown in FIGS. 4 and 5. As a result, an inner end of the lid 70 can be in contact with the sleeve 40 for pushing the sleeve 40 toward the bearing 30, and the bearing 30 is pushed against the first stopping step 12 by the sleeve 40.

The invention further includes a washer 80 put around the tail section 21 of the shaft 20 and between the bearing 30 and the adjusting bushing 40/the nut 60. When the adjusting bushing 50 is at the first position as shown in FIG. 4, the washer 80 is between the bearing 30 and the nut 60. When the adjusting bushing 50 is at the second position as shown in FIG. 5, the washer 80 is between the bearing 30 and the adjusting bushing 50. An inner diameter of the sleeve 40 is greater than both an outer diameter of the nut 60 and an outer diameter of the washer 80.

It will be appreciated by persons skilled in the art that the above embodiment has been described by way of example only and not in any limitative sense, and that various alterations and modifications are possible without departure from the scope of the invention as defined by the appended claims.

What is claimed is:

1. A bicycle pedal comprising:
    a pedal body, having a shaft hole with a first opening, a second opening and a first stopping step therein;
    a shaft, received in the shaft hole, having a middle section, a tail section and a second stopping step between the middle section and the tail section, the tail section having a thread;
    a bearing, put around the tail section of the shaft and in the second opening, being axially slidable along the shaft, and an end of the bearing being blocked by the first stopping step;
    a sleeve, put around the tail section of the shaft, and abutting against the bearing;
    an adjusting bushing, abutting against the bearing, selectively put around either of a first position and a second position of the tail section of the shaft with axially sliding the bearing, wherein the first position and the second position are separately located at two ends of the bearing, the adjusting bushing is between the second stopping step and the bearing when the adjusting bushing is put at the first position, and the bearing is between the second stopping step and the adjusting bushing when the adjusting bushing is put at the second position;
    a nut, screwed on the thread of the tail section of the shaft for pushing both the adjusting bushing and the bearing toward the second stopping step; and
    a lid, fastened in the second opening for pushing both the sleeve and the bearing toward the first stopping step.

2. The bicycle pedal of claim 1, wherein the middle section is provided with a second bearing between the shaft and the shaft hole.

3. The bicycle pedal of claim 2, wherein the second bearing is a self-lubricating bearing, a ball bearing or a needle bearing.

4. The bicycle pedal of claim 1, wherein both the thread of the tail section and a thread of the nut are left-hand threads.

5. The bicycle pedal of claim 1, wherein the middle section is greater than the tail section in diameter, so that the second stopping step is formed at a junction of the middle section and the tail section.

6. The bicycle pedal of claim 1, wherein the lid is of a tubular shape with a closed end, the lid is provided with an outer thread, the second opening is provided with an inner thread, the lid is fastened into the second opening by screwing the inner thread and the outer thread, an inner end of the lid is in contact with the sleeve for pushing the sleeve toward the bearing, and the bearing is pushed against the first stopping step by the sleeve.

7. The bicycle pedal of claim 1, further comprising a washer put around the tail section of the shaft and between the bearing and either the adjusting bushing or the nut.

8. The bicycle pedal of claim 7, wherein the washer is between the bearing and the nut when the adjusting bushing is at the first position, and the washer is between the bearing and the adjusting bushing when the adjusting bushing is at the second position.

* * * * *